United States Patent
Sumi

(10) Patent No.: US 12,469,434 B2
(45) Date of Patent: Nov. 11, 2025

(54) IMAGE PROCESSING METHOD AND DISPLAY SYSTEM

(71) Applicant: Innolux Corporation, Miaoli County (TW)

(72) Inventor: Naoki Sumi, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/625,228

(22) Filed: Apr. 3, 2024

(65) Prior Publication Data

US 2025/0037643 A1    Jan. 30, 2025

Related U.S. Application Data

(60) Provisional application No. 63/528,650, filed on Jul. 25, 2023.

(51) Int. Cl.
  *G09G 3/32* (2016.01)
  *G06F 3/01* (2006.01)
  *G06T 5/70* (2024.01)
  *G06V 10/60* (2022.01)

(52) U.S. Cl.
  CPC ........... *G09G 3/32* (2013.01); *G06F 3/012* (2013.01); *G06F 3/013* (2013.01); *G06T 5/70* (2024.01); *G06V 10/60* (2022.01)

(58) Field of Classification Search
  CPC .... G09G 3/32; G09G 2320/0686; G09G 5/10; G09G 5/37; G06F 3/012; G06F 3/013; G06T 5/70; G06T 5/94; G06V 10/60
  See application file for complete search history.

(56) References Cited

U.S. PATENT DOCUMENTS

| | | | |
|---|---|---|---|
| 2021/0211582 A1* | 7/2021 | Sumi | G06T 11/60 |
| 2023/0280468 A1* | 9/2023 | Zhu | G01S 7/4816 |
| | | | 356/5.01 |
| 2024/0095880 A1* | 3/2024 | Liu | G06N 3/047 |

FOREIGN PATENT DOCUMENTS

| | | |
|---|---|---|
| CN | 113096025 | 7/2021 |
| CN | 110930877 | 3/2023 |

OTHER PUBLICATIONS

Bob Raikes, "Innolux Shines a Light on Kirameki and Natural3D", Display Daily, Jun. 2022, pp. 1-6.
"Search Report of Europe Counterpart Application", issued on Dec. 2, 2024, pp. 1-8.

* cited by examiner

*Primary Examiner* — Premal R Patel
(74) *Attorney, Agent, or Firm* — JCIPRNET

(57) ABSTRACT

An image processing method and a display system are provided. The image processing method includes following steps: receiving image data having angular profile data corresponding to a plurality of positions; processing the image data by performing at least one of filtering noise, image compensation, image modification, and image discontinuity reduction to generate a processed image data; and outputting the processed image data.

16 Claims, 19 Drawing Sheets

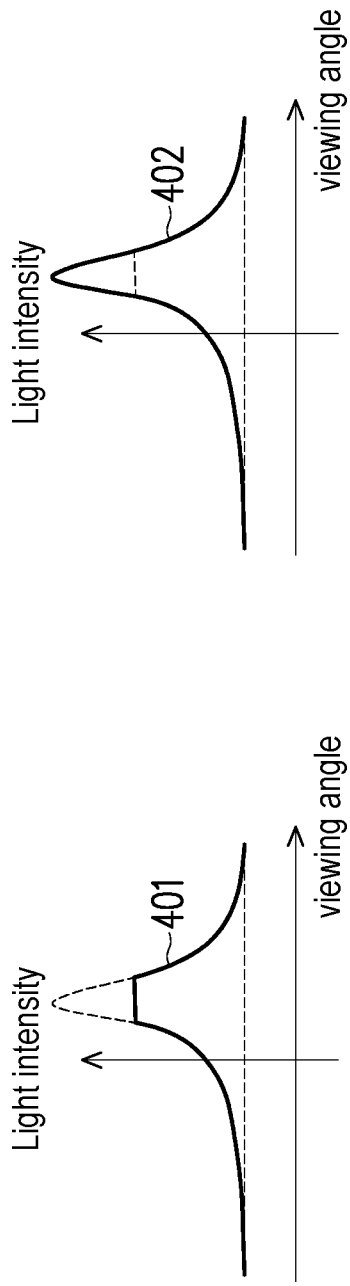

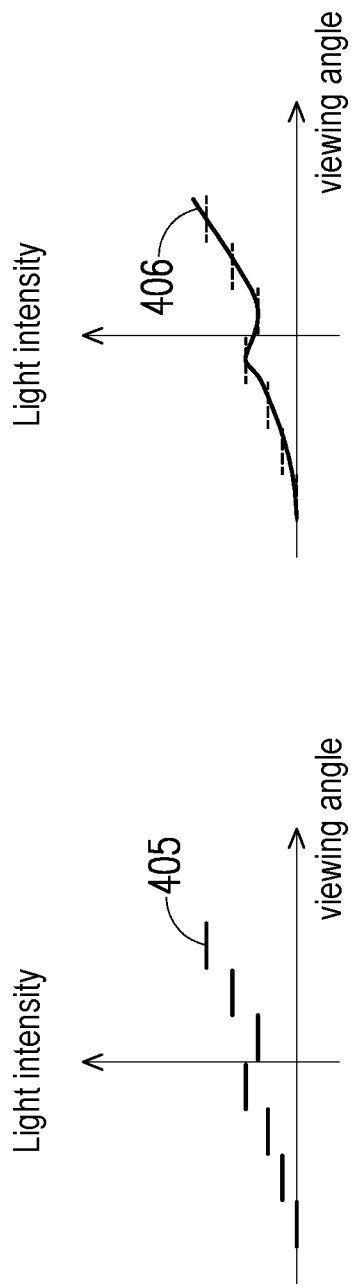

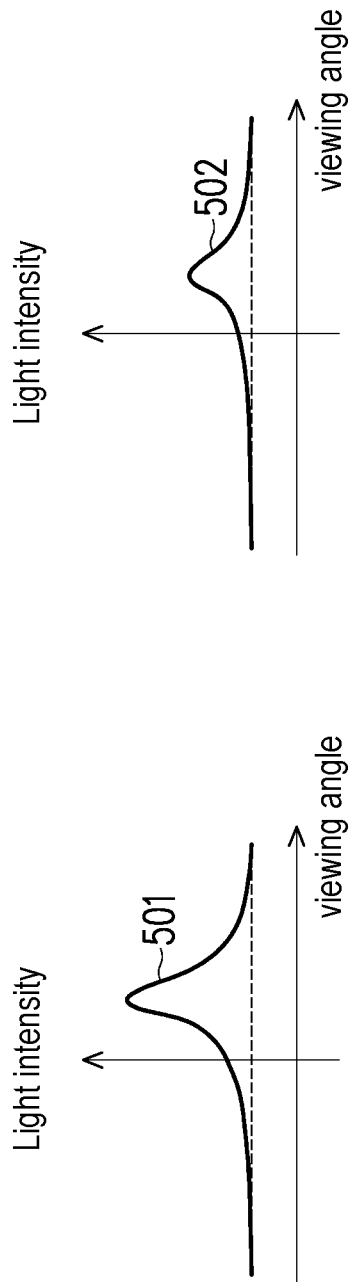

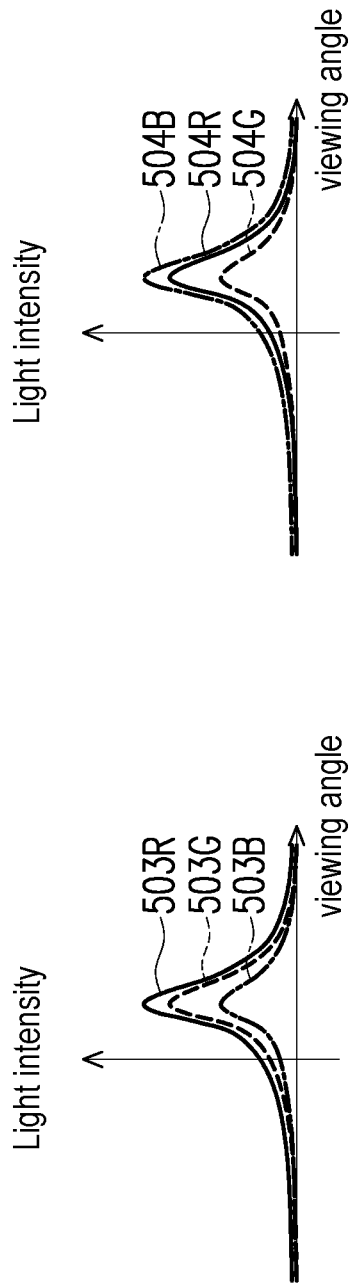

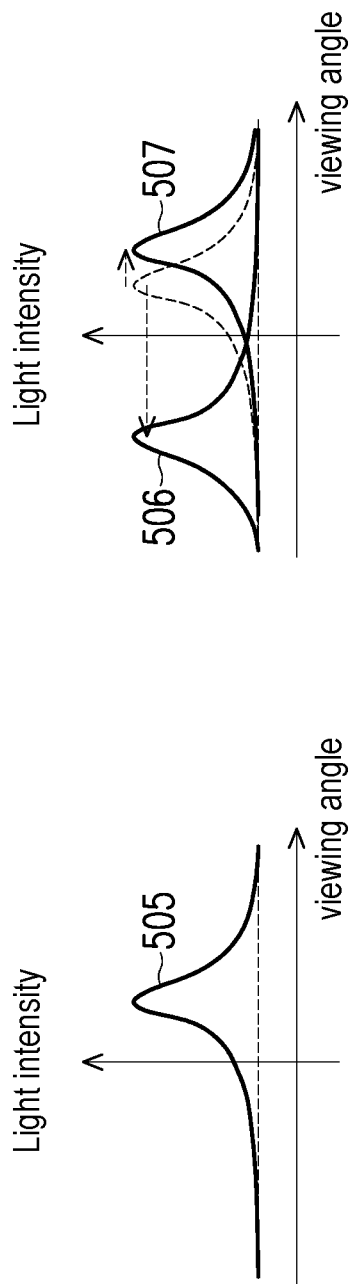

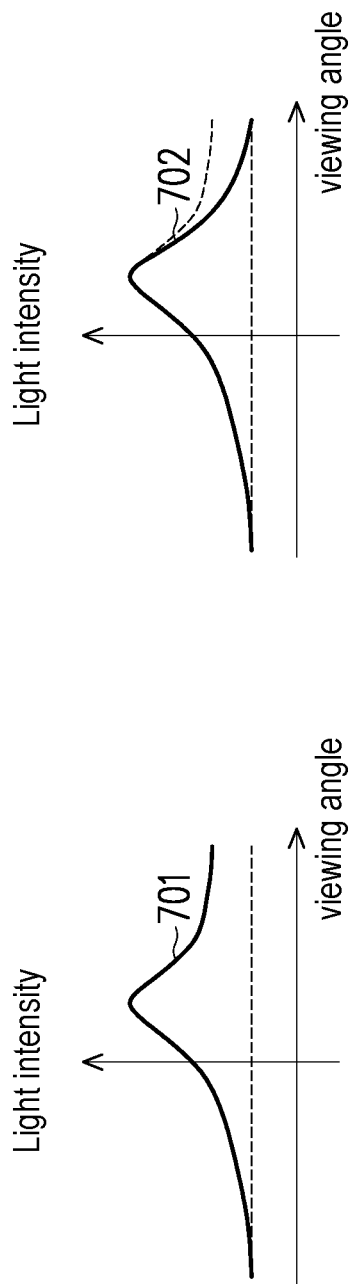

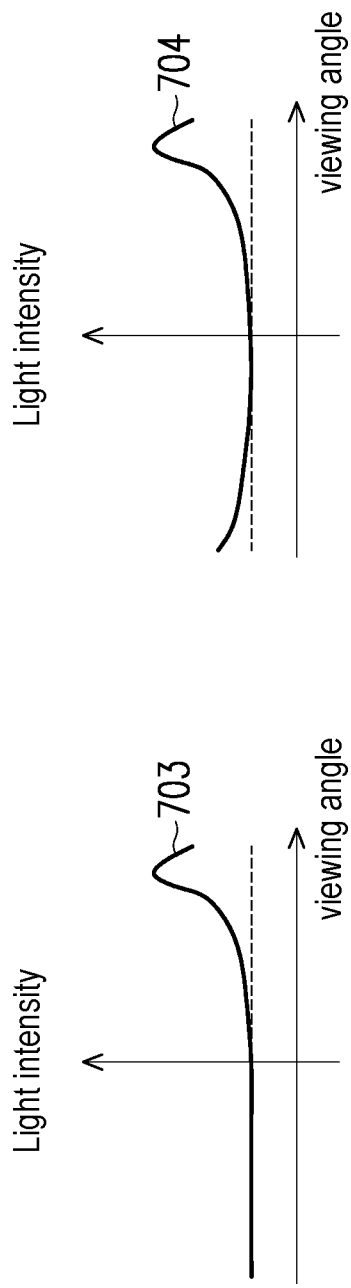

IMAGE PROCESSING METHOD AND DISPLAY SYSTEM

CROSS-REFERENCE TO RELATED APPLICATION

This application claims the priority benefit of U.S. provisional application Ser. No. 63/528,650, filed on Jul. 25, 2023. The entirety of the above-mentioned patent application is hereby incorporated by reference herein and made a part of this specification.

BACKGROUND

Technical Field

The disclosure relates a data processing method; particularly, the disclosure relates to an image processing method and a display system.

Description of Related Art

Currently, high dynamic range (HDR) display technology has been developed to present images with high contrast, so that both bright and dark details in the image can be clearly presented at the same time. However, displays with high dynamic range display technology are still difficult to produce the glossy effect (kirameki effect) that occurs when real light hits an object. Additionally, even if the display can present a glossy and realistic effect, the light profile of the image needs to be further processed or optimized to provide satisfactory visual effects.

SUMMARY

The image processing method of the disclosure includes the following steps: receiving image data having angular profile data corresponding to a plurality of positions; processing the image data by performing at least one of filtering noise, image compensation, image modification, and image discontinuity reduction to generate a processed image data; and outputting the processed image data.

The display system includes a camera, an image processing device, and a display module. The camera provides a plurality of capturing images. The image processing device is coupled to the camera, receives an image data of the plurality of capturing images, and generates a processed image data according to the image data. The display module is coupled to the image processing device, and receives the processed image data. The image data includes angular profile data corresponding to a plurality of positions. The image processing device processes the image data by performing at least one of filtering noise, image compensation, image modification, and image discontinuity reduction to generate a processed image data.

Based on the above, according to the image processing method and the display system of the disclosure may implement effectively image processing on the angular profile data of the image data.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIGS. 4A to 4F are schematic diagrams of angular profile data according to an embodiment of the disclosure.

FIGS. 5A to 5F are schematic diagrams of angular profile data according to an embodiment of the disclosure.

FIGS. 7A to 7E are schematic diagrams of angular profile data according to an embodiment of the disclosure.

DESCRIPTION OF THE EMBODIMENTS

Figure 1:
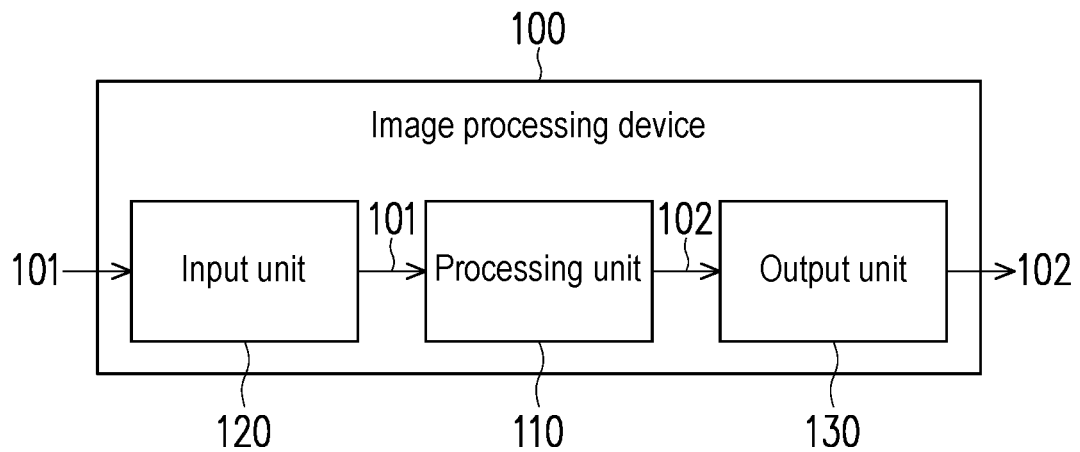
FIG. 1 is a schematic diagram of an image processing device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

FIG. 1 is a schematic diagram of an image processing device according to an embodiment of the disclosure. Referring to FIG. 1, the image processing device 100 includes a processing unit 110, an input unit 120, and an output unit 130. The processing unit 110 is coupled to the input unit 120 and the output unit 130. In the embodiment of the disclosure, the input unit 120 may be coupled to an image source to read an image data 101 which include a plurality of intensity values corresponding to a plurality positions (i.e. a plurality of screen positions (x, y)) and an angular profile of an emitting light ray (i.e. surface light field data). The image source may be a personal computer, one or more digital still cameras (DSC), a video player, or an image server, but the disclosure is not limited thereto. The image data 101 may be two-dimensional image data or three-dimensional image data. The image data 101 may be composed of data of a plurality of capturing images captured by multiple cameras at different viewing angle of the same object. Thus, the image data 101 may include angular profile data corresponding to a plurality of positions.

In the embodiment of the disclosure, the processing unit 110 may receive the image data 101 provided by the input unit 120, and may perform image processing on the image data 101 to generate a processed image data 102. The processing unit 110 outputs the processed image data 102 to the output unit 130. In the embodiment of the disclosure, the output unit 130 may be coupled to a memory storage or a surface light field display device (i.e. a "Kirameki display"). In one embodiment of the disclosure, the output unit 130 may output the processed image data 102 to the surface light field display device. The surface light field display device may show images with realistic glossy display effects for an observer viewing from different viewing angles based on the processed image data 102.

In the embodiment of the disclosure, the processing unit 110 may include, for example, a central processing unit (CPU), a graphic processing unit (GPU), or other programmable general-purpose or special-purpose microprocessor, digital signal processor (DSP), application specific integrated circuit (ASIC), programmable logic device (PLD), other similar processing circuits or a combination of these devices. In the embodiment of the disclosure, the image processing device 100 may further include a storage unit, such as a memory. The processing unit 110 may further be coupled to the storage unit. The storage unit may be, for example, a non-volatile memory (NVM). The storage unit may store relevant programs, modules, data or algorithms for realizing various embodiments of the disclosure, for the processing unit 110 to access and execute to realize the relevant functions and operations described in the various embodiments of the disclosure.

In the embodiment of the disclosure, the input unit 120 and the output unit 130 may be communication interfaces, and have related communication data conversion circuit. In one embodiment of the disclosure, since the image data including the angular profile data may have a large amount of data, at least one of the input unit 120 and the output unit 130 may include a data decompression circuit or a data compression circuit of the angular profile of the light ray by the form of sequential discrete values, coefficients in frequency domain or fitting parameters of waveform.

Figure 2:
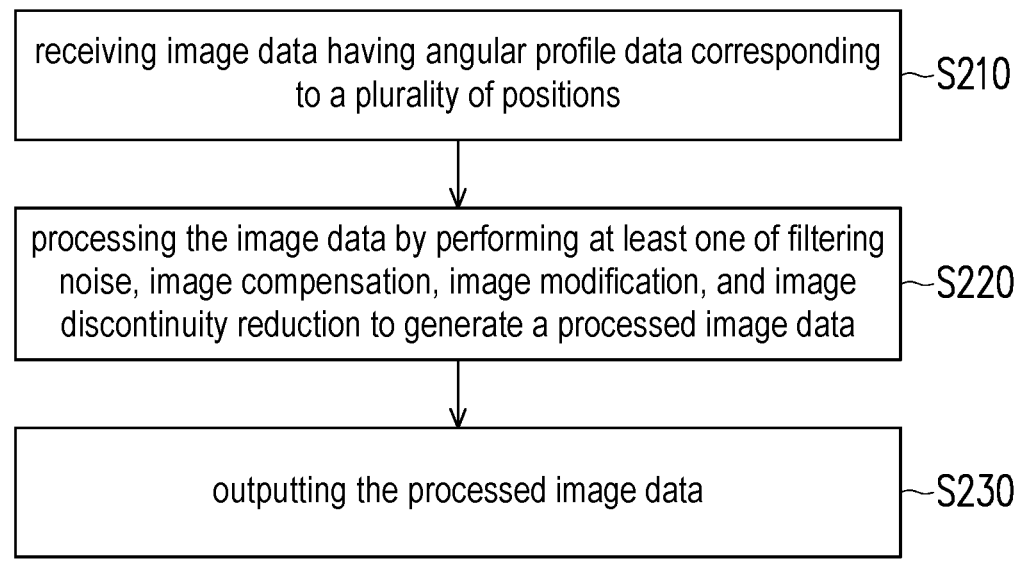
FIG. 2 is a flowchart of an image processing method according to an embodiment of the disclosure.

FIG. 2 is a flowchart of an image processing method according to an embodiment of the disclosure. Referring to FIG. 1 and FIG. 2, the image processing device 100 may execute the following steps S210 to S230. In step S210, the input unit 120 may receive the image data 101 having the angular profile data corresponding to the plurality of positions (i.e. the plurality of screen positions (x, y)). The input unit 120 may further provide the image data 101 having the angular profile data to the processing unit 110. In step S220, the processing unit 110 may process the image data 101 by performing at least one of filtering noise, image compensation, image modification, and image discontinuity reduction to generate the processed image data 102. In one embodiment of the disclosure, the processing unit 110 may process the image data 101 according to specific display requirements or external control requirements. The processing unit 110 may further provide the processed image data 102 to the output unit 130. In step S230, the output unit 130 may output the processed image data 102. The processing method of image data 101 will be described in detail on the following embodiments.

Figure 3C:
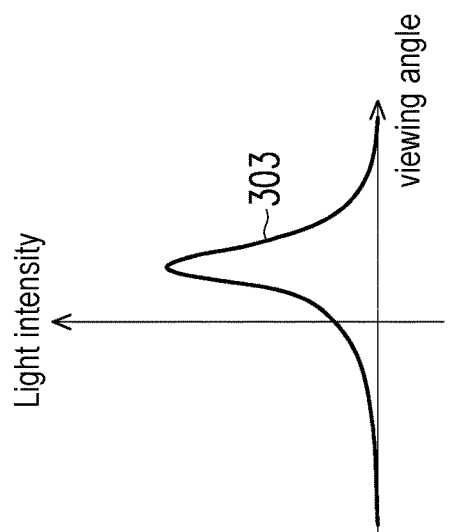
FIG. 3C is a schematic diagram of a specular light component of angular profile data according to an embodiment of the disclosure.
Figure 3B:
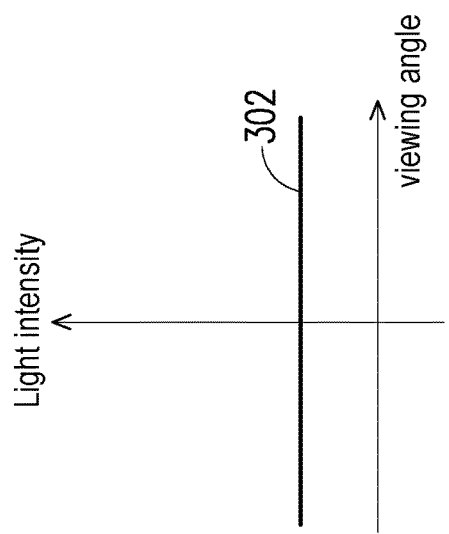
FIG. 3B is a schematic diagram of a minimum light intensity component of angular profile data according to an embodiment of the disclosure.
Figure 3A:
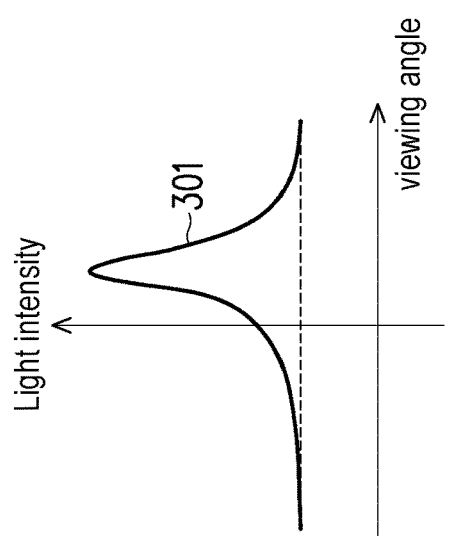
FIG. 3A is a schematic diagram of angular profile data according to an embodiment of the disclosure.

FIG. 3A is a schematic diagram of angular profile data according to an embodiment of the disclosure. Referring to FIG. 1 and FIG. 3A, the processing unit 110 may receive the image data having the angular profile data. As shown in FIG. 3A, taking the angular profile data corresponding to one screen position (i.e. (x, y)) as an example (i.e. the each one screen position can correspond to multiple image data from different viewing angles, and the data format may be (x, y, angle, light intensity value (i.e. gray scale)), for the one screen position, different viewing angles may correspond to different light intensity values. In FIG. 3A, a curve 301 represents the angular profile data including a plurality of light intensity values corresponding to different viewing angles at the one screen position (i.e. (x, y)). In other words, if the display module displays this image data, when the observer views the one screen position from different viewing angles, the observer can see the display content with different gloss effects (or spotlight effects).

FIG. 3B is a schematic diagram of a minimum light intensity component of angular profile data according to an embodiment of the disclosure. FIG. 3C is a schematic diagram of a specular light component of angular profile data according to an embodiment of the disclosure. Referring to FIG. 1 and FIG. 3A to FIG. 3C, the image data 101 may include data of a plurality of capturing images at different viewing angle, and the processing unit 110 may process the plurality of capturing images to separate a plurality of diffuse light component images and a plurality of specular light component images for use in the image processing process of subsequent embodiments. It should be noted that the image gloss in the diffuse light component images does not change at different viewing angles due to ambient light coming from, for example, walls or ceilings, and the image gloss in specular light component images may be changed due to, for example, one or more spotlights.

In the embodiment of the disclosure, the processing unit 110 may determine a minimum light intensity component corresponding to each position in the plurality of capturing images, and processing unit 110 may generate the plurality of diffuse light component images according to the minimum light intensity component in each one of the plurality of capturing images. As shown in FIG. 3B, the angular profile data of each diffuse light component image at each position may show as a curve 302 shown in FIG. 3B. Then, the processing unit 110 may respectively subtract the minimum light intensity component from the each one of the plurality of capturing images to generate the plurality of specular light component images. As shown in FIG. 3C, the angular profile data of each specular light component image at each position may show as a curve 303 shown in FIG. 3C.

Figure 4C:
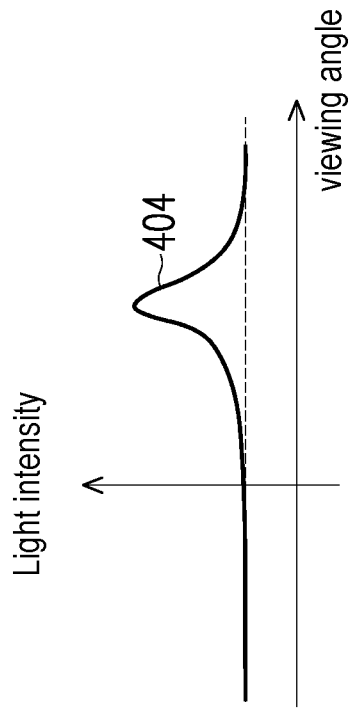

FIGS. 4A to 4F are schematic diagrams of angular profile data according to an embodiment of the disclosure. Referring to FIG. 1, FIG. 4A, and FIG. 4B, the image data 101 may include data of a truncated light profile image, and the processing unit 110 may compensate lost peak data in the truncated light profile image. As shown in FIG. 4A, a curve 401 represents the angular profile data including a plurality of light intensity values corresponding to different viewing angles at the one screen position (i.e. (x, y)), and some light intensity values in a peak of the curve 401 are truncated (e.g. corresponding to an overexposure effect in the image). In the embodiment of the disclosure, the processing unit 110 may compensate the lost peak data of FIG. 4A (or the lost peak data in the specular light component of the angular profile data of the curve 303 in FIG. 3C), so as to generate the compensated angular profile data as shown as a curve 402 of FIG. 4B. Specifically, the processing unit 110 may estimate the profile corresponding to the lost peak data from neighboring screen position that without overexposed, or the processing unit 110 may fit a curve corresponding to the lost peak data by a light distribution formula. Therefore, the processing unit 110 may recover the lost peak data of light profile, and generate photos with a higher dynamic range.

Figure 4D:
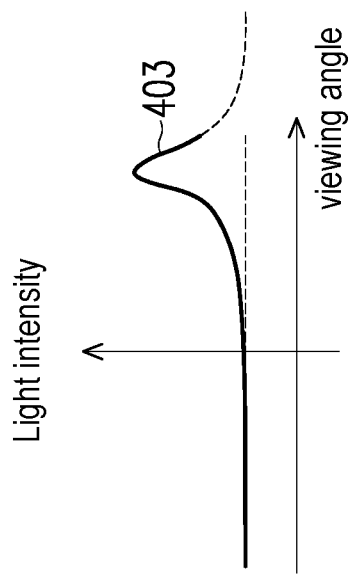

Referring to FIG. 1, FIG. 4C, and FIG. 4D, the image data 101 may include data of a truncated light profile image, and the processing unit 110 may compensate missing angular profile data out of a viewing angle range in the truncated light profile image. As shown in FIG. 4C, a curve 403 represents the angular profile data including a plurality of light intensity values corresponding to different viewing angles at the one screen position (i.e. (x, y)), and some light intensity values in the curve 403 out of a viewing angle range are truncated. In the embodiment of the disclosure, the processing unit 110 may compensate the missing angular profile data of FIG. 4C (or the missing angular profile data in the specular light component of the angular profile data of the curve 303 in FIG. 3C), so as to generate the compensated angular profile data as shown as a curve 404 of FIG. 4D. Specifically, the processing unit 110 may estimate the profile from neighboring screen position that has different peak position, or the processing unit 110 may fit a curve corresponding to the missing angular profile data by a light distribution formula. Therefore, the processing unit 110 may extend the angle range of light profile, even if the measured profile was not enough.

Referring to FIG. 1, FIG. 4E, and FIG. 4F, the light intensity values of the angular profile data of the image data 101 may be in an 8-bit data format. As shown in FIG. 4E, a curve 405 represents the angular profile data in 8-bit data format. The processing unit 110 may perform sampling step compensation on the angular profile data of the curve 405 (or the angular profile data of the curve 303 in FIG. 3C), so as to generate a compensated angular profile data as shown as a curve 406 in FIG. 4F. Specifically, the processing unit 110 may perform linear or non-linear interpolation for the angular profile data, so as to increase the angle step size of the angle profile data. Alternatively, the processing unit 110 may perform fit a curve by a light distribution formula or a low-pass filter to increase the angle step size of the angle profile data", for example, 0~255 (8 bit) to 0~4095 (12 bit). Therefore, the processing unit 110 may perform filtering noise on the image to reduce noise in dark part of the image. The processing unit 110 may solve Mach band issue and show smooth gradation of a picture.

FIGS. 5A to 5F are schematic diagrams of angular profile data according to an embodiment of the disclosure. FIGS. 6A to 6D are schematic diagrams of adjusting spotlight effect on an object according to an embodiment of the disclosure. Referring to FIG. 1, FIG. 5A and FIG. 5B, the processing unit 110 may receive the image data having the angular profile data. In FIG. 5A, a curve 501 represents the angular profile data including a plurality of light intensity values corresponding to different viewing angles at the one screen position (i.e. (x, y)), and the curve 501 may have too strong light intensity values at certain viewing angles. The processing unit 110 may modify at least one light intensity value corresponding to at least one specific viewing angle corresponding to each position in the angular profile data. Specifically, the processing unit 110 may generate the diffuse light profile image as described in the above embodiment of FIG. 3B to obtain a minimum light intensity value. The processing unit 110 may subtract each light intensity value of the curve 501 by the minimum light intensity value, multiply by an adjustment factor, and then add back the minimum light intensity value, so as to generate the angular profile data of a curve 502 as shown in FIG. 5B. The adjustment factor may be greater than 0. Therefore, the corresponding specular light in the some specific viewing angle may become proper and comfortable. The processing unit 110 may increase or decrease the specular light intensity of the light profile in the some specific viewing angle after capturing. The processing unit 110 may optimize image quality and get the best image performance.

Figure 6B:
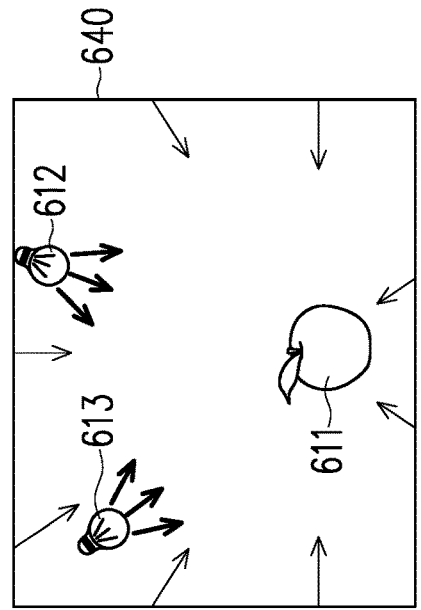
FIGS. 6A to 6D are schematic diagrams of adjusting spotlight effect on an object according to an embodiment of the disclosure.
Figure 6D:
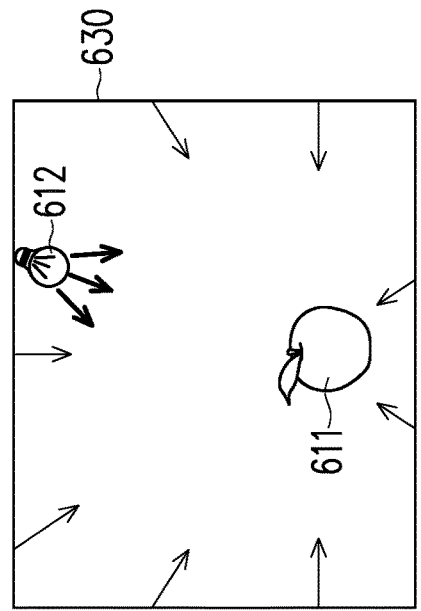
Figure 6A:
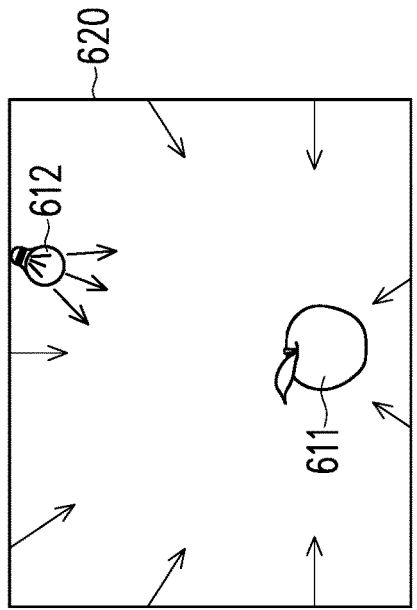

For example, referring to FIG. 6A, the initial lighting condition 610 may include an object 611, and the object 611 has too strong glossy effect caused by the spotlight 612. The processing unit 110 may adjust the angular profile data of the corresponding image data as above embodiment to decrease the light intensity values in the angular profile data. Thus, an adjusted light condition may show as FIG. 6B. In FIG. 6B, the adjusted light condition 620 may include a decreased spotlight 621, and the object 611 has proper glossy effect. That is, the display content displayed by the display module presents the effect of dimming the spotlight 612.

Referring to FIG. 1, FIG. 5C and FIG. 5D, the processing unit 110 may receive the image data having the angular profile data respectively corresponding to different colors (e.g. red, green, and blue). The processing unit 110 may extract a plurality of specular light profile images corresponding to the different colors as described in the above embodiment of FIG. 3C, and the processing unit 110 may modify at least one light intensity value corresponding to at least one color corresponding to each position in the angular profile data. Specifically, in FIG. 5C, curves 503R, 503G, and 503B represent specular light components of the angular profile data for red, green, and blue, respectively. Each curve includes a plurality of light intensity values corresponding to different viewing angles at the one screen position (i.e. (x, y)), and the curves 503R, 503G, and 503B may correspond to yellowish display effect. The processing unit 110 may respectively modify the light intensity values of the curves 503R, 503G, and 503B to curves 504R, 504G, and 504B as shown in FIG. 5D, and the curves 504R, 504G, and 504B may correspond to bluish display effect. That is, the processing unit 110 may, for example, adjust the spotlight color in the image with keeping diffuse light color (i.e. basic light color). Moreover, the processing unit 110 may also adjust to get similar colors between specular and diffuse lights in the image.

Figure 6C:
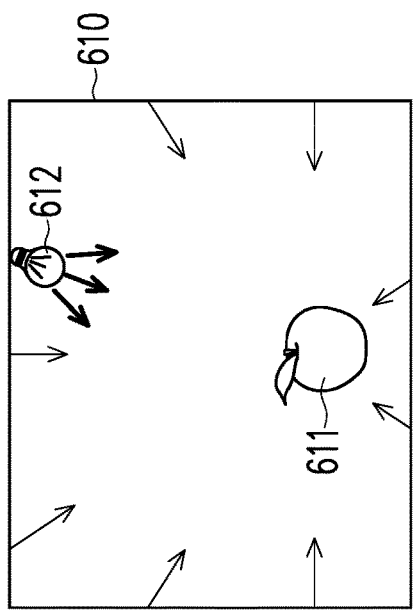

For example, referring to FIG. 6A, the initial lighting condition 610 may include an object 611, and the object 611 looks yellowish caused by the spotlight 612. The processing unit 110 may adjust the angular profile data corresponding to different colors of the corresponding image data as above embodiment. Thus, the adjusted lighting condition may show as FIG. 6C. In FIG. 6C, the adjusted lighting condition 630 may include the object 611, and the object 611 looks bluish. That is, the display content displayed by the display module presents the effect of changing the hue of the spotlight 612.

Referring to FIG. 1, FIG. 5E and FIG. 5F, the processing unit 110 may receive the image data having the angular profile data. The processing unit 110 may modify at least one light intensity value corresponding to each position in the angular profile data. The processing unit 110 may extract specular light component of the angular profile data as described in the above embodiment of FIG. 3C. The processing unit 110 may modify the light intensity values to shift and/or add the light profile, and add the modified specular light component image to the diffuse light component image to generate the processed image. Specifically, in FIG. 5E, a curve 505 represents the angular profile data including a plurality of light intensity values corresponding to different viewing angles at the one screen position (i.e. (x, y)). The processing unit 110 may shift and add the light profile according to the curve 505 to generate curves 506 and 507. That is, the processing unit 110 may shift a spotlight effect in the capturing image or add more spotlight effects in the capturing image.

For example, referring to FIG. 6A, the initial lighting condition 610 may include an object 611, and the object image 611 has spotlight effect caused by the spotlight 612. The processing unit 110 may adjust the angular profile data of the corresponding image data as above embodiment. Thus, the adjusted lighting condition may show as FIG. 6D. In FIG. 6D, the adjusted light condition 640 may include the object image 611, and the object 611 has more spotlight effect. That is, the display content displayed by the display module presents the spotlight effect of the spotlight 612 and a spotlight 613 on the object 611 at the same time.

Figure 7E:
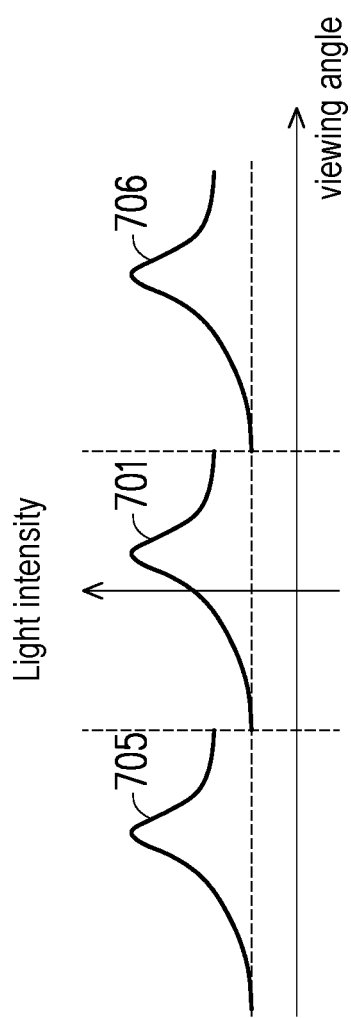

FIGS. 7A to 7E are schematic diagrams of angular profile data according to an embodiment of the disclosure. Referring to FIG. 1, FIG. 7A, and FIG. 7B, the image data 101 may include a discontinuous light profile in angle, and the processing unit 110 may adjust at least one light intensity value corresponding to each position in the angular profile data to reduce the discontinuous light profile in angle. As shown in FIG. 7A, a curve 701 represents the angular profile data including a plurality of light intensity values corresponding to different viewing angles at the one screen position (i.e. (x, y)), and the curve 701 forms a discontinuous light profile in angle. In the embodiment of the disclosure, the processing unit 110 may adjust some light intensity values of the curve 701 to reduce the discontinuous light profile in angle. After adjusting the some light intensity values of the curve 701, as shown in FIG. 7B, an intensity value corresponding to one end angle of a light intensity distribution of a curve 702 is equal to another intensity value corresponding to another end angle of the light intensity distribution of the curve 702.

Specifically, the processing unit 110 may generate the diffuse light profile image as described in the above embodiment of FIG. 3B to obtain a minimum light intensity value. The processing unit 110 may subtract each light intensity value of the curve 701 by the minimum light intensity value, multiply by an adjustment factor, and then add back the minimum light intensity value, so as to generate the angular profile data of the curve 702 as shown in FIG. 7B. The adjustment factor may between 0 and 1, and gradually becoming 0 at one end angle to another end angle. Therefore, the light intensity values of the curve 702 in the one end angle and the another end angle are reduced to 0 gradually.

Referring to FIG. 1, FIG. 7C, and FIG. 7D, the image data 101 may include a discontinuous light profile in angle, and the processing unit 110 may adjust at least one light intensity value corresponding to each position in the angular profile data to reduce the discontinuous light profile in angle. As shown in FIG. 7C, a curve 703 represents the angular profile data including a plurality of light intensity values corresponding to different viewing angles at the one screen position (i.e. (x, y)), and the curve 703 forms a discontinuous light profile in angle. In the embodiment of the disclosure, the processing unit 110 may adjust some light intensity values of the curve 703 to reduce the discontinuous light profile in angle. After adjusting the some light intensity values of the curve 703, as shown in FIG. 7D, an intensity value corresponding to one end angle of a light intensity distribution of a curve 704 is equal to another intensity value corresponding to another end angle of the light intensity distribution of the curve 704.

Specifically, the processing unit 110 may generate the diffuse light profile image as described in the above embodiment of FIG. 3B to obtain a minimum light intensity value. The processing unit 110 may subtract each light intensity value of the curve 703 by the minimum light intensity value, multiply by an adjustment factor, and then add back the minimum light intensity value, so as to generate the angular profile data of the curve 704 as shown in FIG. 7D. The adjustment factor may between 0 and 1, and gradually becoming 1 at one end angle to another end angle. Therefore, the light intensity values of the curve 704 adjacent to the one end angle are increased to another light intensity value of the curve 704 in the another end angle.

Referring to FIG. 1 and FIG. 7E, in one embodiment, the processing unit 110 may also copy the light intensity values of the curve 701 of FIG. 7A to increase the data of a curve 705 and a curve 706 as shown in FIG. 7E. Therefore, the processing unit 110 may effectively expand the light profile in other viewing angles in the angular profile data.

Figure 8:
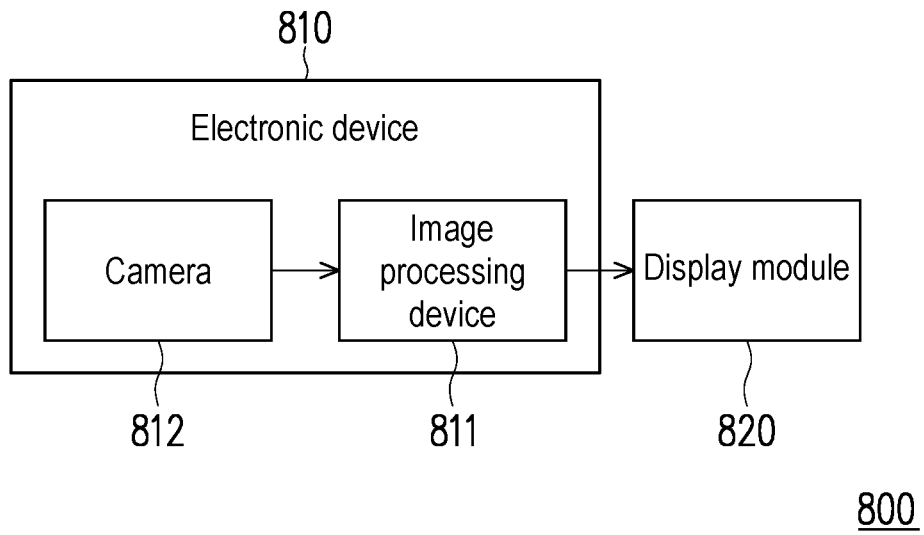
FIG. 8 is a schematic diagram of a display system according to an embodiment of the disclosure.

FIG. 8 is a schematic diagram of a display system according to an embodiment of the disclosure. Referring to FIG. 8, the display system 800 includes an electronic device 810 and a display module 820. The electronic device 810 includes an image processing device 811 and a camera 812. The image processing device 811 is coupled to the camera 812 and the display module 820. The image processing device 811 can implement the relevant image processing functions and hardware features of the image processing device 100 in the above embodiment. In the embodiment of the disclosure, the image processing device 811 and the camera 812 are integrated into the electronic device 810. The electronic device 810 is a terminal device or a computer device, etc. In one embodiment of the disclosure, the electronic device 810 is a video capture device, and the display module 820 is a surface light field display device (i.e. Kirameki display device). The camera 812 is configured to generate the image data having angular profile data, and provide the image data having the angular profile data to the image processing device 811. The image processing device 811 is configured to process the image data having the angular profile data, and generate processed image data to drive the display module 820. The camera 812 may be a single-eye image sensor or a multiple-sys image sensor, or the camera 812 may also include a depth sensor (e.g. ToF sensor) for obtaining a three-dimensional form information of objects on the scene. In one embodiment of the disclosure, the electronic device 810 may further include a memory device for storing the image data. The electronic device 810 may further include a fish eye sensor for obtain a light map on the scene.

Figure 9:
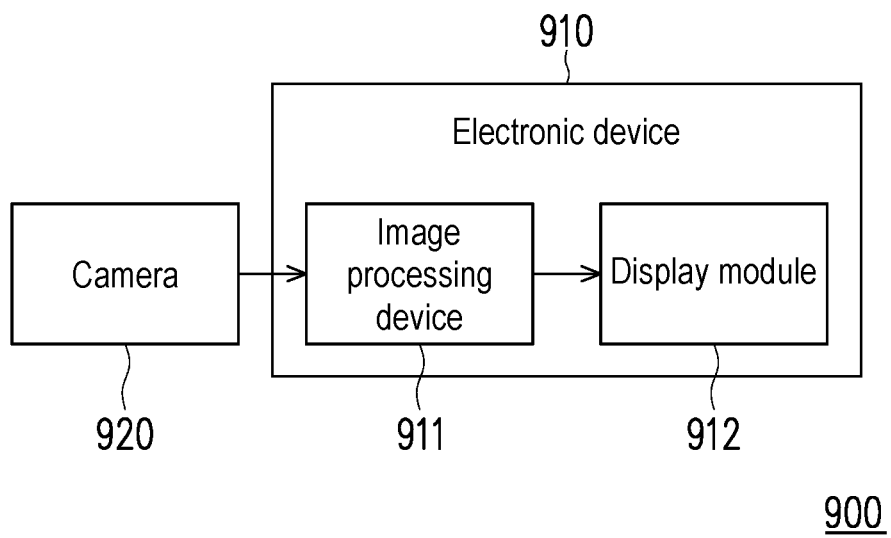
FIG. 9 is a schematic diagram of a display system according to an embodiment of the disclosure.

FIG. 9 is a schematic diagram of a display system according to an embodiment of the disclosure. Referring to FIG. 9, the display system 900 includes an electronic device 910 and a camera 920. The electronic device 910 includes an image processing device 911 and a display module 912. The image processing device 911 is coupled to the display module 912. The image processing device 911 can implement the relevant image processing functions and hardware features of the image processing device 100 in the above embodiment. In the embodiment of the disclosure, the image processing device 911 and the display module 912 are integrated into the electronic device 910. The display module 912 is a surface light field display device (i.e. Kirameki display device). The camera 920 is configured to generate the image data having angular profile data, and provide the image data having the angular profile data to the image processing device 911. The image processing device 911 is configured to process the image data having the angular profile data, and generate processed image data to drive the display module 912.

In one embodiment of the disclosure, the display module 912 may further include at least one pixel array on a display module such as a liquid crystal display (LCD) panel, a mini light emitting diode (LED) panel, a micro LED panel, an organic light emitting diode panel and etc. The display module 912 may further include an optical component such as lenticular lens, liquid crystal gradient-index (LC GRIN) lens, a parallax barrier or a LC parallax barrier that modulate the light ray from pixels in space to each different direction (angle). The display module 912 may further include a display control circuit, and the display control circuit is configured to control an angular profile output of light intensities from each pixel based on the angular profile data of the image data.

In addition, in one embodiment of the disclosure, the image processing device 911, the display module 912 and the camera 920 may also be all integrated into the electronic device 910. The electronic device 910 may be, for example, a smartphone or a tablet computer.

Figure 10A:
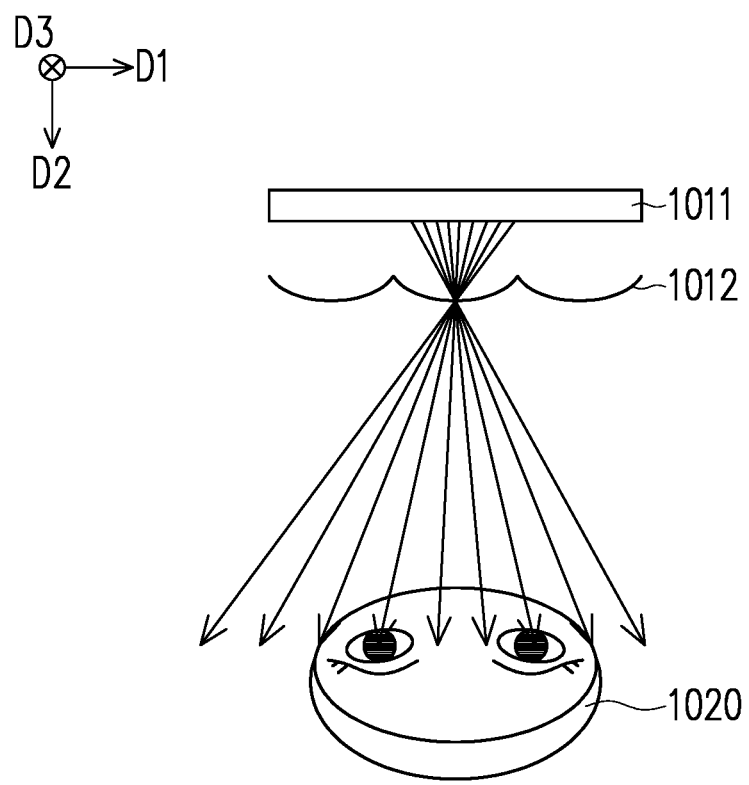
FIGS. 10A, 10C and 10E are schematic diagrams of an observer viewing a display module according to an embodiment of the disclosure.
Figure 10B:
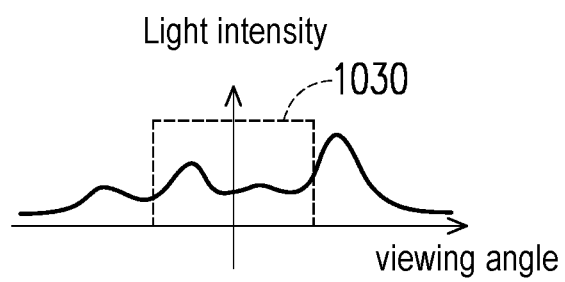
FIGS. 10B, 10D and 10F are schematic diagrams of angular profile data according to an embodiment of the disclosure.
Figure 10C:
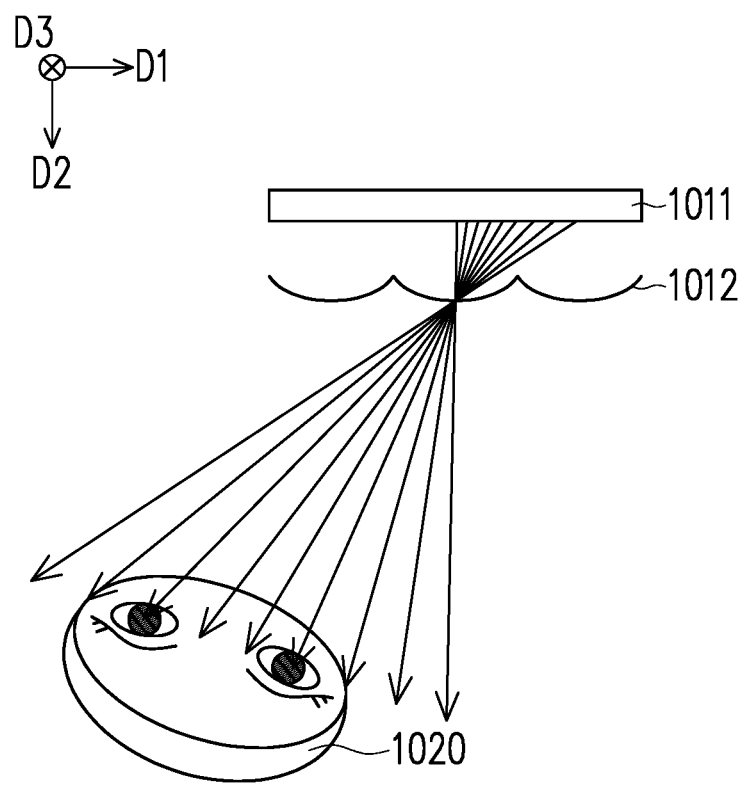
Figure 10D:
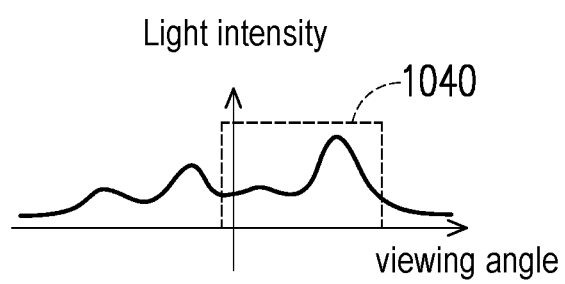
Figure 10E:
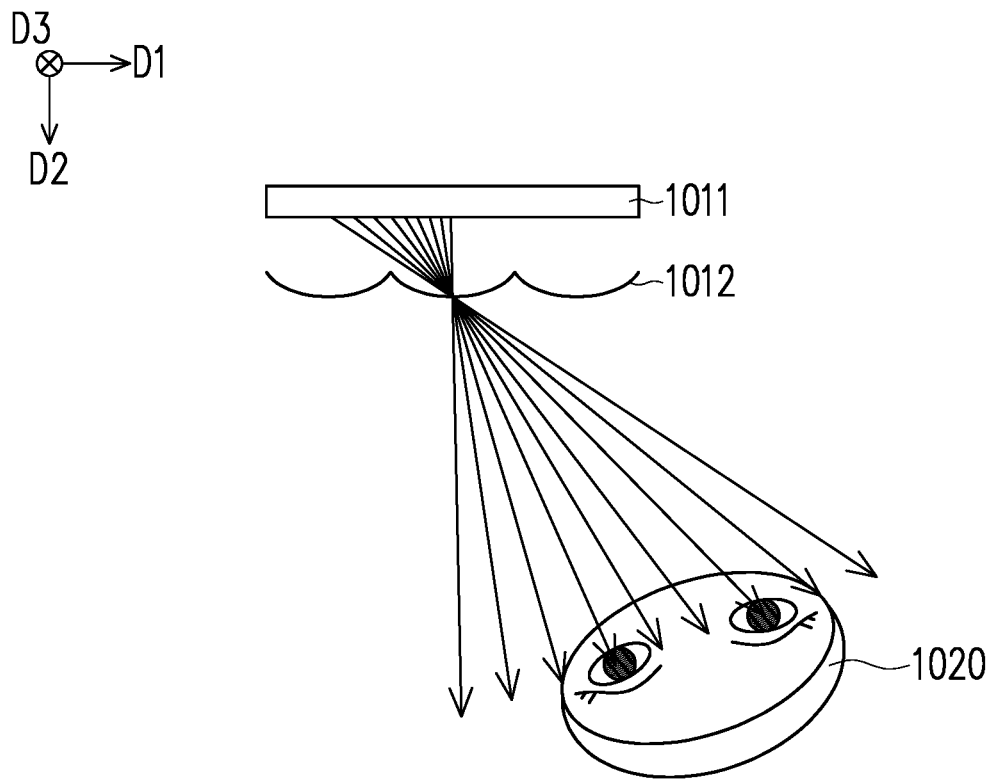
Figure 10F:
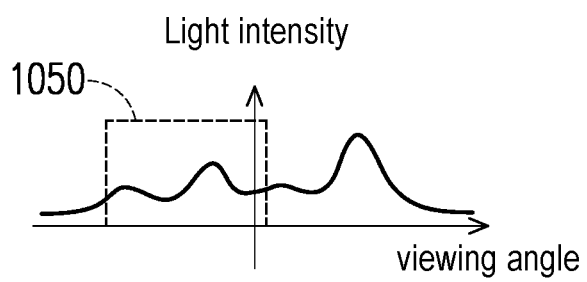

FIGS. 10A, 10C and 10E are schematic diagrams of an observer viewing a display module according to an embodiment of the disclosure. FIGS. 10B, 10D and 10F are schematic diagrams of angular profile data according to an embodiment of the disclosure. In the embodiment of the disclosure, the display system 800 of FIG. 8 and the display system 900 of FIG. 9 may respectively further include an eye-tracking sensor coupled to the image processing device 811 and the image processing device 911, and the eye-tracking sensor may be a RGB camera, a IR camera or a ToF sensor. The eye-tracking sensor is configured to detect an eye position or a head position of an observer, and an image processing device of the electronic device may process the image data according to the eye position or the head position, so as to adjust angles of emitting light rays of a display module driven by the processed image data.

Specifically, in FIG. 10A, the display module may include a pixel array 1011 and a lenticular lens 1012. The pixel array 1011 and the lenticular lens 1012 are respectively extend in a direction D1 and a direction D3. The pixel array 1011 may provide emitting light rays through the lenticular lens 1012 toward a direction D2, and the emitting light rays are provided to an observer 1020. The directions D1 to D3 are perpendicular to each other. In the embodiment of the disclosure, the eye-tracking sensor of the electronic device may detect an eye position or a head position of the observer 1020, and the image processing device of the electronic device may process the image data according to the eye position or the head position. As shown in FIG. 10B, the image processing device of the electronic device may use angular profile data corresponding to an angle range 1030 according to the eye position or the head position of the observer 1020 to generate the processed image data for driving the pixel array 1011.

In one embodiment of the disclosure, in FIG. 10C, if the observer 1020 moves to view the display module sideways, the eye-tracking sensor of the electronic device may detect the eye position or the head position of the observer 1020 is changed. Thus, as shown in FIG. 10D, the image processing device of the electronic device may change to use angular profile data corresponding to an angle range 1040 to generate the processed image data for driving the pixel array 1011, so as to adjust angles of emitting light rays provided by the pixel array 1011.

In one embodiment of the disclosure, in FIG. 10E, if the observer 1020 moves to view the display module sideways from another side, the eye-tracking sensor of the electronic device may detect the eye position or the head position of the observer 1020 is changed. Thus, as shown in FIG. 10F, the image processing device of the electronic device may change to use angular profile data corresponding to an angle range 1050 to generate the processed image data for driving the pixel array 1011, so as to adjust angles of emitting light rays provided by the pixel array 1011.

Therefore, the image processing device of the electronic device may effectively process the angular profile data according to the eye position or the head position of the observer 1020 to generate the processed image data for driving the pixel array 1011. The pixel array 1011 can provide display content with realistic gloss variations in wide range that change based on the viewer's viewing angle.

Figure 11A:
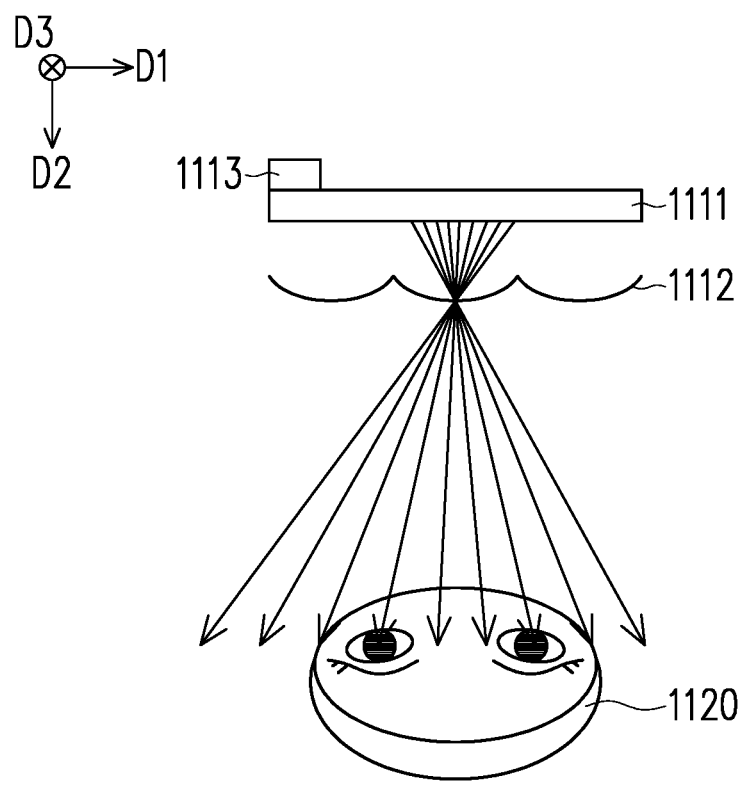
FIGS. 11A, 11C and 11E are schematic diagrams of an observer viewing a display module according to an embodiment of the disclosure.
Figure 11B:
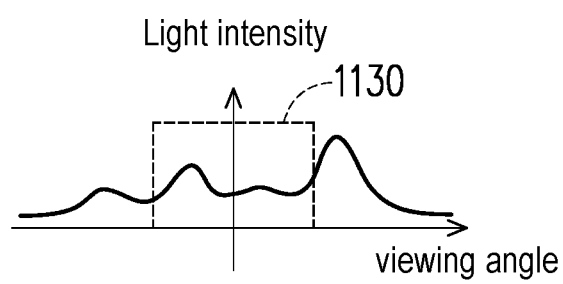
FIGS. 11B, 11D and 11F are schematic diagrams of angular profile data according to an embodiment of the disclosure.
Figure 11C:
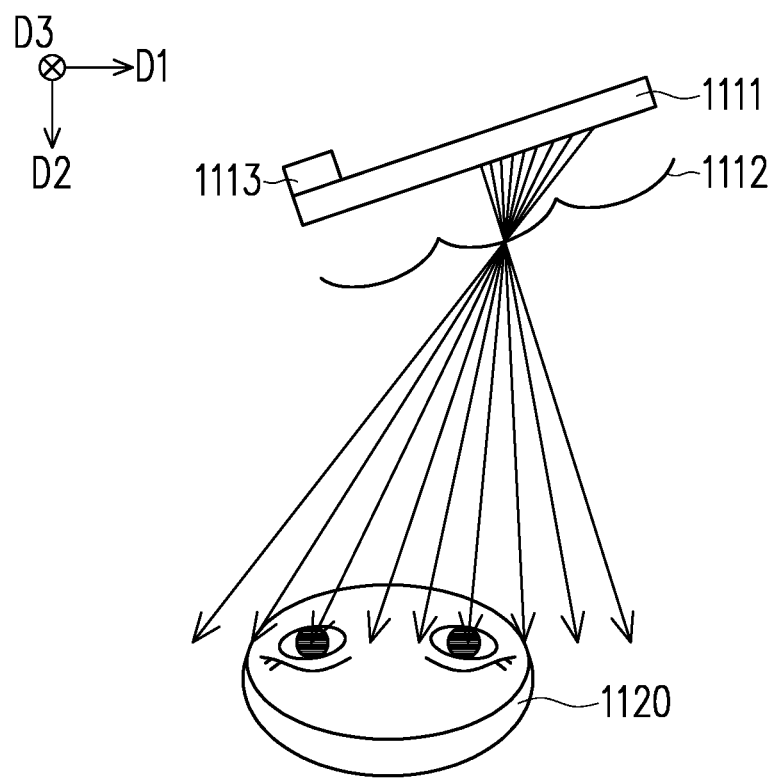
Figure 11D:
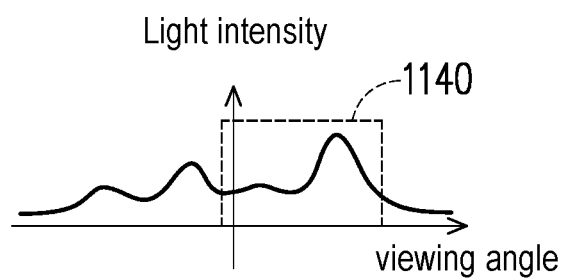
Figure 11E:
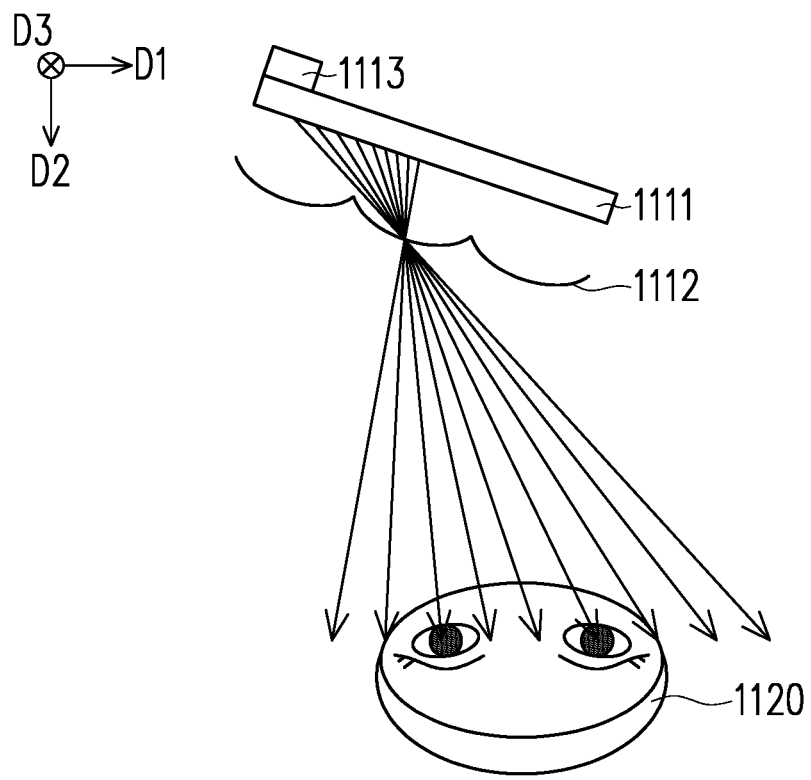
Figure 11F:
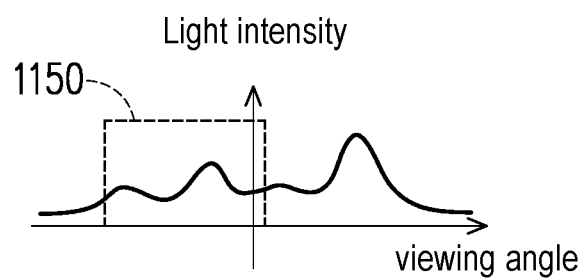

FIGS. 11A, 11C and 11E are schematic diagrams of an observer viewing a display module according to an embodiment of the disclosure. FIGS. 11B, 11D and 11F are schematic diagrams of angular profile data according to an embodiment of the disclosure. In the embodiment of the disclosure, the display system 800 of FIG. 8 and the display system 900 of FIG. 9 may respectively further include a motion sensor coupled to the image processing device 811 and the image processing device 911, and the motion sensor may be an accelerometer or a gyroscope. The motion sensor is configured to detect a display position or a tilt angle of a display module, and an image processing device of the electronic device may process the image data according to the display position or the tilt angle, so as to adjust angles of emitting light rays of a display module driven by the processed image data.

Specifically, in FIG. 11A, the display module may include a pixel array 1111, a lenticular lens 1112, and a motion sensor 1113. The pixel array 1111 and the lenticular lens 1112 are respectively extend in a direction D1 and a direction D3. The pixel array 1111 may provide emitting light rays through the lenticular lens 1112 toward a direction D2, and the emitting light rays are provided to an observer 1120. The directions D1 to D3 are perpendicular to each other. In the embodiment of the disclosure, the motion sensor 1113 may detect a display position or a tilt angle of the display module, and the image processing device of the electronic device may process the image data according to the display position or the tilt angle of the display module. As shown in FIG. 11B, the image processing device of the electronic device may use angular profile data corresponding to an angle range 1130 according to the display position or the tilt angle of the display module to generate the processed image data for driving the pixel array 1111.

In one embodiment of the disclosure, in FIG. 11C, if the display module rotates an angle counterclockwise, the motion sensor 1113 may detect the display position or the tilt angle of the display module is changed. Thus, as shown in FIG. 11D, the image processing device of the electronic device may change to use angular profile data corresponding to an angle range 1140 to generate the processed image data for driving the pixel array 1111, so as to adjust angles of emitting light rays provided by the pixel array 1111.

In one embodiment of the disclosure, in FIG. 11E, if the observer 1120 rotates an angle clockwise, the motion sensor 1113 may detect the display position or the tilt angle of the display module is changed. Thus, as shown in FIG. 11F, the image processing device of the electronic device may change to use angular profile data corresponding to an angle range 1150 to generate the processed image data for driving the pixel array 1111, so as to adjust angles of emitting light rays provided by the pixel array 1111.

Therefore, the image processing device of the electronic device may effectively process the angular profile data according to the display position or the tilt angle of the display module to generate the processed image data for driving the pixel array 1111. The pixel array 1111 can provide display content with realistic gloss variations in wide range that change based on the display position or the tilt angle of the display module.

In summary, the image processing method and the display system of the disclosure may implement effectively image processing functions on image data with angular profile data to generate appropriate angular profile data required for use. The image processing method may effectively drive the display module according to the processed image data to provide display content with realistic gloss variations in wide range.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing method, comprising:
    receiving image data having angular profile data corresponding to a plurality of positions;
    processing the image data by performing at least one of filtering noise, image compensation, image modification, and image discontinuity reduction to generate a processed image data; and
    outputting the processed image data,
    wherein the image data comprises a plurality of capturing images, and the step of processing the image data comprises:
        separating a plurality of diffuse light component images and a plurality of specular light component images from the plurality of capturing images,
    wherein the step of separating the plurality of diffuse light component images and the plurality of specular light component images from the plurality of capturing images comprises:
        determining a minimum light intensity component corresponding to each position in the plurality of capturing images;
        generating the plurality of diffuse light component images according to the minimum light intensity component in each one of the plurality of capturing images; and
        respectively subtracting the minimum light intensity component from the each one of the plurality of capturing images to generate the plurality of specular light component images.

2. The image processing method according to claim 1, wherein the angular profile data comprises a plurality of light intensity values corresponding to a plurality of viewing angles.

3. The image processing method according to claim 1, wherein the image data comprises a truncated light profile image, and the step of processing the image data comprises:
    compensating at least one of lost peak data and missing angular profile data in the truncated light profile image.

4. The image processing method according to claim 1, wherein the step of processing the image data comprises:
    performing sampling step compensation on the angular profile data.

5. The image processing method according to claim 1, wherein the step of processing the image data comprises:
    modifying at least one light intensity value corresponding to at least one color corresponding to each position in the angular profile data.

6. The image processing method according to claim 1, wherein the step of processing the image data comprises:
    adjusting at least one light intensity value corresponding to each position in the angular profile data to reduce a discontinuous light profile in angle.

7. The image processing method according to claim 6, wherein the step of adjusting the at least one light intensity value comprises:
    subtracting each light intensity value by a corresponding minimum light intensity value, multiplying by a second adjustment factor, and then adding back the corresponding minimum light intensity value, wherein the second adjustment factor is between 0 and 1, and gradually becoming 0 at one end angle of a light intensity distribution of each position to another end angle of the light intensity distribution.

8. The image processing method according to claim 6, wherein after adjusting the at least one light intensity value corresponding to the each position in the angular profile data, a first intensity value corresponding to one end angle of a light intensity distribution of each position is equal to a second intensity value corresponding to another end angle of the light intensity distribution of the each position.

9. The image processing method according to claim 1, wherein the step of processing the image data comprises:

copying a plurality of light intensity values of the angular profile data to expand a light profile in other viewing angles in the angular profile data corresponding to each position.

10. The image processing method according to claim 1, wherein the step of processing the image data comprises:
   detecting an eye position or a head position; and
   processing the image data according to the eye position or the head position, so as to adjust an angle of an emitting light ray of a display module driven by the processed image data.

11. The image processing method according to claim 1, wherein the step of processing the image data comprises:
   detecting a display position or a tilt angle of a display module; and
   processing the image data according to the display position or the tilt angle, so as to adjust an angle of an emitting light ray of a display module driven by the processed image data.

12. A display system, comprising:
   a camera, providing a plurality of capturing images;
   an image processing device, coupled to the camera, receiving an image data of the plurality of capturing images, and generating a processed image data according to the image data;
   a display module, coupled to the image processing device, and receiving the processed image data; and
   a motion sensor, coupled to the image processing device,
   wherein the image data comprises angular profile data corresponding to a plurality of positions, and the image processing device processes the image data by performing at least one of filtering noise, image compensation, image modification, and image discontinuity reduction to generate a processed image data,
   wherein the motion sensor detects a display position or a tilt angle of the display module, and the image processing device processes the image data according to the display position or the tilt angle, so as to adjust an angle of an emitting light ray of a display module driven by the processed image data.

13. The display system according to claim 12, further comprising:
   an eye-tracking sensor, coupled to the image processing device,
   wherein the eye-tracking sensor detects an eye position or a head position, and the image processing device processes the image data according to the eye position or the head position, so as to adjust an angle of an emitting light ray of a display module driven by the processed image data.

14. The display system according to claim 12, wherein the image processing device comprises:
   an input unit, coupled to the camera, and receiving the image data of the plurality of capturing images;
   a processing unit, coupled to the input unit, and processing the image data to generate the processed image data according to the image data; and
   an output unit, coupled to the processing unit and the display module, and outputting the processed image data to the display module.

15. The display system according to claim 12, wherein the display module is a surface light field display device.

16. An image processing method, comprising:
   receiving image data having angular profile data corresponding to a plurality of positions;
   processing the image data by performing at least one of filtering noise, image compensation, image modification, and image discontinuity reduction to generate a processed image data; and
   outputting the processed image data,
   wherein the step of processing the image data comprises:
      adjusting at least one light intensity value corresponding to at least one specific viewing angle corresponding to each position in the angular profile data,
   wherein the step of adjusting the at least one light intensity value comprises:
      subtracting each light intensity value by a corresponding minimum light intensity value, multiplying by a first adjustment factor, and then adding back the corresponding minimum light intensity value, wherein the first adjustment factor is greater than 0.

* * * * *